United States Patent
Schuetz et al.

(10) Patent No.: US 8,468,912 B2
(45) Date of Patent: Jun. 25, 2013

(54) PRODUCTION METHOD FOR AN INSERTION END, SUCH AS FOR A DRILLING, CHISELING OR BORING TOOL

(75) Inventors: Gerhard Schuetz, Schlins (AT); Frank Anschuetz, Schaan (LI); Thomas Traxler, Viktorsberg (AT); Guenther Domani, Frastanz (AT); Christian Schoerken, Balzers (LI); Gernot Weisser, Koenigsbrunn (DE)

(73) Assignee: Hilti Aktiengesellschaft, Schaan (LI)

( * ) Notice: Subject to any disclaimer, the term of this patent is extended or adjusted under 35 U.S.C. 154(b) by 273 days.

(21) Appl. No.: 12/932,210

(22) Filed: Feb. 18, 2011

(65) Prior Publication Data

US 2011/0290079 A1  Dec. 1, 2011

(30) Foreign Application Priority Data

Feb. 22, 2010  (DE) .................. 10 2010 002 167

(51) Int. Cl.
*B21K 5/02* (2006.01)
*B21K 5/04* (2006.01)
(52) U.S. Cl.
USPC ........... 76/108.6; 76/108.1; 72/354.2; 72/358
(58) Field of Classification Search
USPC ............... 76/101.1, 108.1, 108.6; 72/352, 72/358, 359, 353.6, 354.2, 370.1, 370.12, 72/370.13; 408/226
See application file for complete search history.

(56) References Cited

U.S. PATENT DOCUMENTS

| | | | |
|---|---|---|---|
| 1,291,388 A * | 1/1919 | Bright et al. ................. | 403/266 |
| 1,607,089 A * | 11/1926 | Leidecker ..................... | 72/64 |
| 3,504,575 A * | 4/1970 | Makino Masao et al. ... | 76/108.1 |
| 3,555,935 A * | 1/1971 | Dorrenberg ................. | 76/108.6 |
| 3,637,225 A * | 1/1972 | Schmuck .................... | 279/81 |
| 4,107,949 A * | 8/1978 | Wanner et al. ............... | 464/167 |
| 4,389,870 A * | 6/1983 | Boeni et al. .................. | 72/354.2 |
| 4,943,192 A * | 7/1990 | Lafforgue et al. ........... | 408/226 |
| 5,028,057 A | 7/1991 | Wanner ........................ | 279/19.3 |
| 5,076,371 A * | 12/1991 | Obermeier et al. .......... | 408/226 |
| 5,324,145 A * | 6/1994 | Kleine ......................... | 408/226 |
| 5,421,682 A | 6/1995 | Obermeier et al. .......... | 408/226 |
| 6,601,659 B2 * | 8/2003 | Saitta et al. .................. | 175/323 |
| 7,628,232 B2 * | 12/2009 | Koch et al. ................... | 175/323 |
| 7,765,846 B2 | 8/2010 | Stueckrad .................... | 72/339 |
| 2004/0181926 A1 * | 9/2004 | Dion et al. ................... | 29/434 |

FOREIGN PATENT DOCUMENTS

| | | |
|---|---|---|
| DE | 80 11 289 U1 | 2/1982 |
| DE | 84 33 275 U1 | 3/1986 |
| DE | 374 50 46 C | 7/1996 |
| DE | 199 15 303 A1 | 10/1999 |
| DE | 10 2006 041 273 A1 | 3/2007 |
| EP | 2 181 783 A1 | 5/2010 |

* cited by examiner

*Primary Examiner* — Hwei C Payer
(74) *Attorney, Agent, or Firm* — Davidson, Davidson & Kappel, LLC

(57) ABSTRACT

A production method for an insertion end, especially for an insertion end of a drilling, chiseling or boring tool, including the following steps: a longitudinal groove is formed in the outer surface of a preferably cylindrical end piece of a blank, whereby the longitudinal groove acquires an open end section on a front face of the end piece. The outer surface of the end piece is surrounded by a die tool that engages into the longitudinal groove outside of its open end section. The open end section is closed in that the surrounded end piece is compressed by means of a stamp acting on the front face. The segmented, multi-component die tool preferably lies flush against the outer surface of the end piece outside of the longitudinal grooves.

8 Claims, 3 Drawing Sheets

PRODUCTION METHOD FOR AN INSERTION END, SUCH AS FOR A DRILLING, CHISELING OR BORING TOOL

This claims the benefit of German patent application DE 10 2010 002 167.9, filed Feb. 22, 2010 and hereby incorporated by reference herein.

The present invention relates to a production method for an insertion end, especially for an insertion end of a drilling, chiseling or boring tool.

BACKGROUND

German patent DE 3745046 C discloses an insertion end commonly used in modern drills. This essentially cylindrical insertion end has two closed longitudinal grooves situated across from each other. Latching elements of a tool-receiving socket can engage into the closed longitudinal grooves and secure the drill bit so that it cannot fall out of the tool-receiving socket. The insertion end also has one or more longitudinal grooves that are open on one side. One axial, open end of the open longitudinal grove is flush with the front face of the insertion end. The insertion end can be pushed by means of a rotary catch that is located on the tool-receiving socket and that intermeshes into the open longitudinal groove.

SUMMARY OF THE INVENTION

It is an object of the present invention to provide a production method for an insertion end, especially for an insertion end of a cutting, for instance, drilling, chiseling or boring tool, comprising the following steps: a longitudinal groove is formed in the outer surface of a preferably cylindrical end piece of a blank, whereby the longitudinal groove acquires an open end section on a front face of the end piece. The outer surface of the end piece is surrounded by a die tool that engages into the longitudinal groove away from, i.e. outside, of its open end section. The open end section is closed in that the surrounded end piece is compressed by means of a stamp acting on the front face. The segmented, multi-component die tool preferably lies flush against the outer surface of the end piece outside of the longitudinal grooves around the entire circumference, preferably along the entire axial extension of the end piece.

With the method, the closed longitudinal grooves that serve to lock a drilling, chiseling or boring tool can be produced without the need for cutting process steps. The surrounding die tool acquires the shape of the longitudinal groove, up to its end section. During the compression, which acts onto the free, relatively large front face in the axial direction, sufficient material of the end piece can be pushed in the radial direction to close off the longitudinal groove in spite of the massive form of the blank.

The die tool can engage into the longitudinal groove with a molded part, whereby this molded part is shorter than the longitudinal groove. Moreover, the molded part can completely fill the longitudinal groove with a positive fit, up to the open end section.

In one embodiment of the production method, an additional longitudinal groove having an open end section on the front face is formed in the outer surface. The die tool engages into the additional longitudinal groove, whereby the die tool completely fills the additional longitudinal groove with a molded part. The additional longitudinal groove is preferably formed along with the longitudinal groove in one process step, for instance, by means of extrusion.

BRIEF DESCRIPTION OF THE DRAWINGS

The description that follows explains the invention on the basis of figures and embodiments provided by way of examples. The figures show the following.

DETAILED DESCRIPTION

Figure 1:
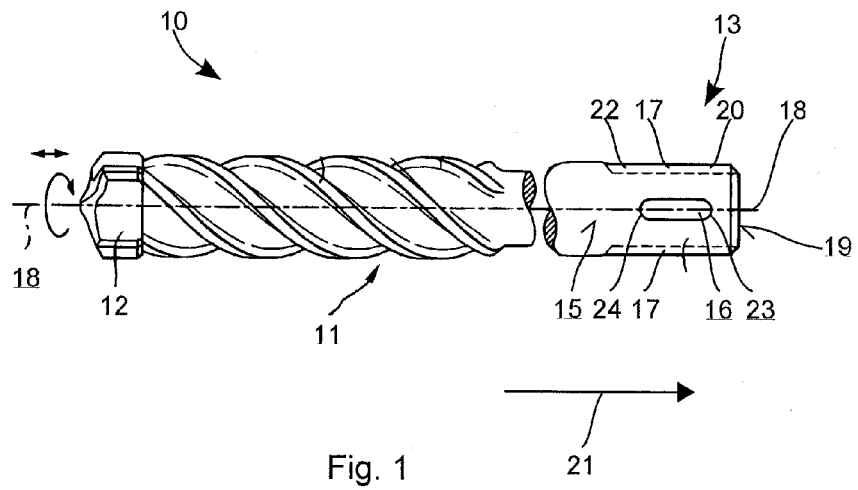
FIG. 1 a drill bit.

The same or functionally equivalent elements are designated by the same reference numerals in the figures unless otherwise indicated.

FIG. 1 shows an example of a drill bit 10 that is especially suited for boring work to break stone or construction materials. The drill bit 10 has a shank 11 which, by way of an example, is shaped in the form of a spiral. There is a drilling head 12 at one end of the shank 11. Whereas the shank 11 is made of metal, the drilling head 12 can be made of a hard metal (carbide) to perform more demanding breaking work. An insertion end 13 is formed at the other end of the shank 11. As will be explained below, the shank 11 and the insertion end 13 can be made of the same grade of steel and are manufactured out of one blank 14.

The insertion end 13 is preferably based on a cylindrical base body. Two closed longitudinal grooves 16 and two longitudinal grooves 17 that are open on one side are formed in the outer surface 15 of the insertion end 13. The longest extension of each of the longitudinal grooves 16, 17 is oriented parallel to an axis 18 of the insertion end 13. The longitudinal groove 17 that is open on one side extends all the way to a front face 19 of the insertion end 13, as a result of which one end section 20 of the open longitudinal groove 17 is not surrounded by any material of the insertion end 13 in the axial direction 21, that is to say, it is open in the axial direction 21. The other axial end section 22 of the open longitudinal groove 17 is preferably limited, i.e. closed, in the axial direction 21 by material of the insertion end 13. The axial end sections 23, 24 of the closed longitudinal groove 16 are both closed and surrounded by material of the insertion end 13 in the axial direction. The number and angular arrangement of the longitudinal grooves 16, 17 are only indicated by way of example; in particular, the number of longitudinal grooves 17 can be either greater or smaller.

The longitudinal grooves 17 that are open on one side and the closed longitudinal grooves 16 are produced without cutting process steps such as, for instance, milling.

Figure 2:
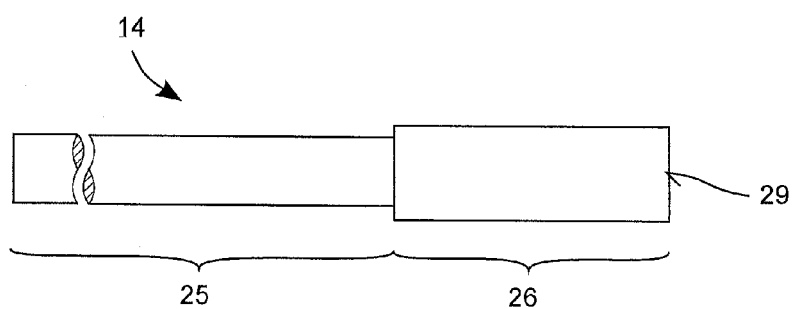
FIG. 2 a blank.

The starting point for the drill bit 10 can be a cylindrical blank 14. This blank 14 is cut, for example, from a steel wire having a suitable diameter. The diameter of the steel wire preferably matches the largest diameter of the drill bit 10 that is to be manufactured. In the example shown, the diameter is based on the diameter of the insertion end 13, which is greater than the diameter of the shank 11. In a non-cutting forming process, the section 25 of the blank 14 for the shank 11 is reduced to the requisite diameter, for instance, by means of extrusion or rolling. The formed blank now has an end piece 26 that forms the base body for the later insertion end 13 and for the typically much longer section 25 for the later shank 11 (FIG. 2). The diameter of the end piece 26 can be slightly adjusted if this is necessary, for example, for calibration purposes. The diameter of the end piece 26 can be greater than 1 cm, for example, 1.7 cm. If the diameter of the shank 11 in the case of a different drill bit is greater than that of the insertion end 13, the diameter of the blank 14 is reduced accordingly to the diameter of the insertion end 13.

Figure 3:
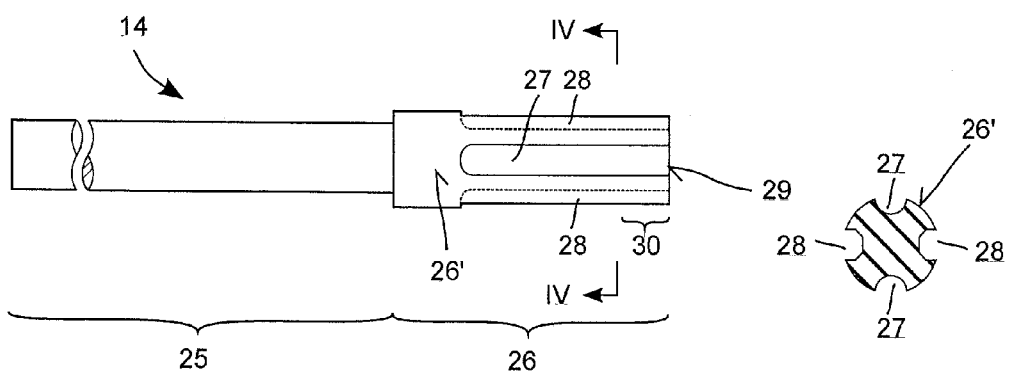
FIG. 3 the blank with stamped longitudinal grooves.
Figure 4:
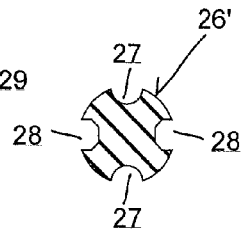
FIG. 4 a cross section through the blank of FIG. 3 along the plane IV-IV.

Extrusion is employed to form first longitudinal grooves 27 in the end piece 26 of the blank 14 as well as second longitudinal grooves 28 in the outer surface 33. During the extrusion process, the end piece 26 is extruded through an annular die starting with a front face 29. In this process, the contour of the inside of the annular die is replicated on the end piece 26, and the open longitudinal grooves 27, 28 are formed to correspond to the appropriately selected contour. The longitudinal grooves 27, 28 can be formed together with a single annular die or else consecutively with two or more annular dies. The formed blank 14 is shown in a side view (FIG. 3) and in a cross section in the plane IV-IV perpendicular to the axis 18 (FIG. 4). All of the longitudinal grooves 27, 28 extend all the way to an exposed front face 29 of the end piece 26, as a result of which they acquire an open end section 30. The longitudinal grooves 27, 28 can have various cross sections and be of a length along the axis 18 that differs from the one shown.

Figure 5:
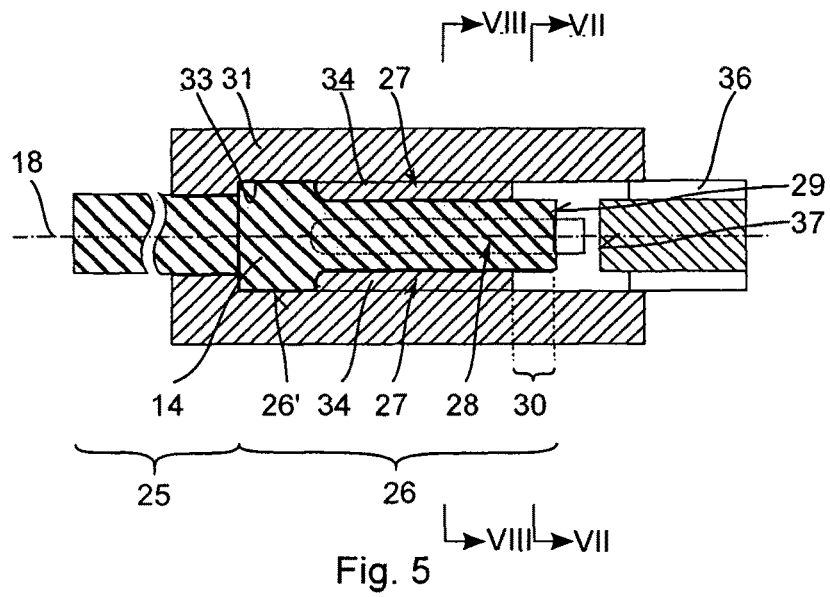
FIG. 5 a longitudinal section of a die tool with an inserted blank from FIG. 3.
Figure 6:
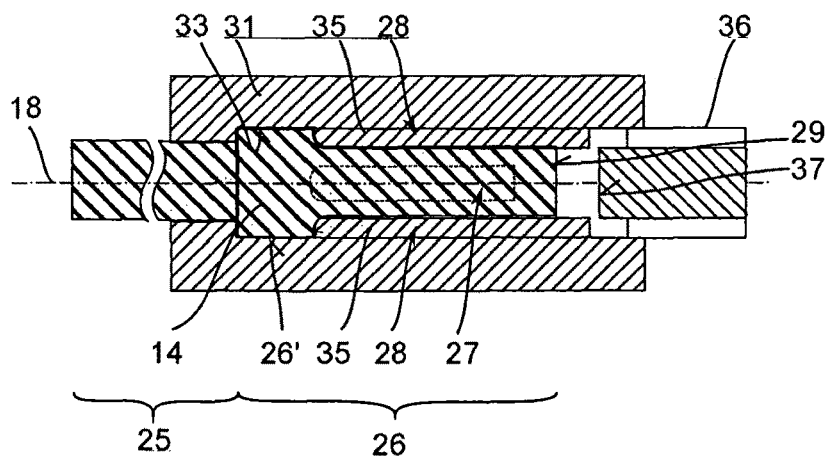
FIG. 6 like FIG. 5, but rotated by 90° around the axis.
Figure 7:
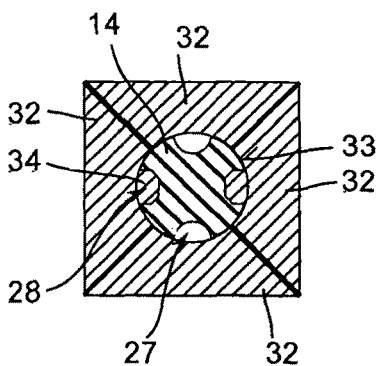
FIG. 7 cross section in the plane VII-VII of FIG. 5.
Figure 8:
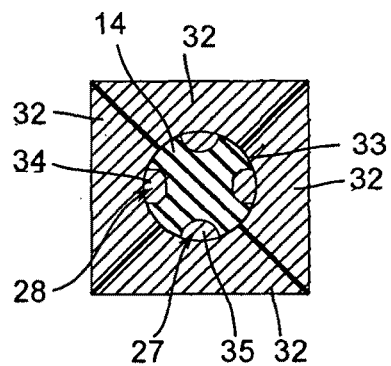
FIG. 8 cross section in the plane VIII-VIII of FIG. 5.

The blank 14 with the longitudinal grooves 27, 28 is placed into a segmented or multi-component die tool 31. FIGS. 5 and 6 show longitudinal sections through the die tool 31 that are rotated with the inserted blank 14 by 90° relative to each other around the axis 18. FIGS. 7 and 8 show two cross sections through the die tool 31 and through the blank 14 perpendicular to the axis 18 relative to FIG. 5 in different axial positions in the planes VII-VII and VIII-VIII, respectively.

The die tool 31 preferably has several segments 32 that are placed onto the outer surface 26' of the end piece 26 and that surround the end piece 26 like a ring so as to be flush with its outer surface 26'. Preferably, the end piece 26 is completely surrounded along its axial extension by the segments 32.

Preferably, the die tool 31 surrounds the end piece 26 or the blank 14 in the axial direction as well. The inner contour 33 of the segments 32 can be essentially hollow-cylindrical, from which first molded parts 34 and molded parts 35 project inwards. The molded parts 34, 35 are adapted to the shape of the longitudinal grooves 27, 28 in such a way that they can completely engage into the longitudinal grooves 27, 28, while the inner contour 33 lies flush on the outer surface 26' of the end piece 26. The molded parts 34, 35 are elongated along the axis 18 and their cross section can match the cross section of the longitudinal grooves 27, 28.

The first molded part 34 leaves free the open, axial end section 30 of the first longitudinal groove 27 (see FIG. 7). The end section 30 remains free, for example, over an axial length in the range from 5 mm to 15 mm and preferably over the entire cross section of the longitudinal groove 27. The other sections of the longitudinal groove 27 can be completely filled by the first molded part 34.

The second molded part 35, in contrast to the first molded part 34, fills the open, axial end section 30 of the second longitudinal groove 28. Preferably, the second molded part 35 completely fills the second longitudinal groove 28, as a result of which the side surfaces of the second molded part 35 lie on the side surfaces of the longitudinal groove 28 with a positive fit. For this purpose, the length of the second molded part 35 can be of at least the same length as the second longitudinal groove 28, whereby the length along the axis 18 is ascertained. Preference is given to a second molded part 38 that extends beyond the front face 19 along the axis 18, for instance, the second molded part 35 is longer than the second longitudinal groove 28.

Figure 9:
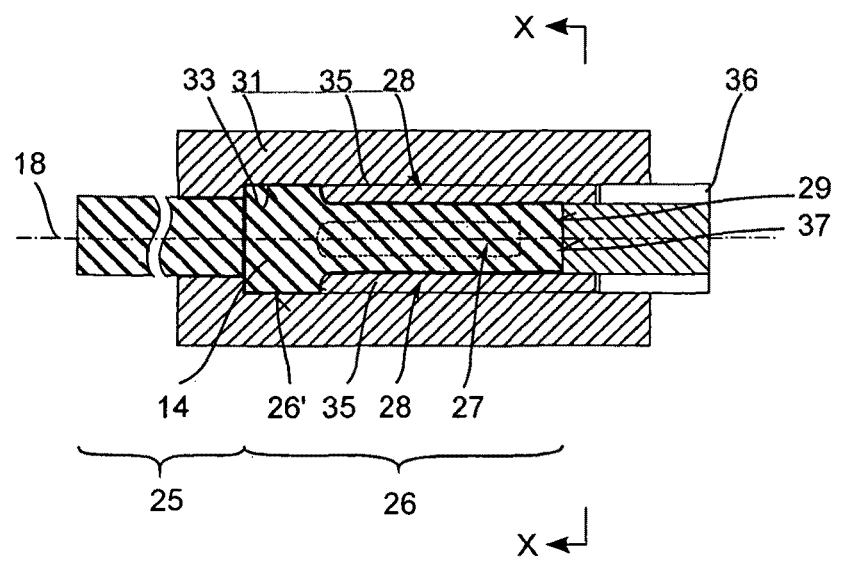
FIG. 9 stamping die in action.
Figure 10:
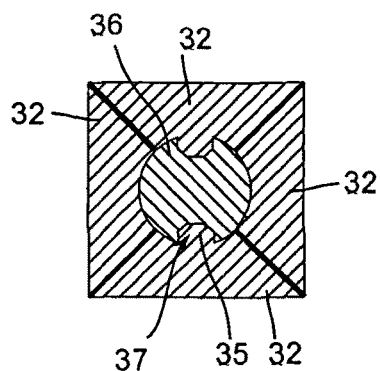
FIG. 10 cross section through the stamping die in the plane X-X of FIG. 9.

A stamping die 36 is pressed onto the exposed front face 29 of the end piece 26 (FIG. 9). FIG. 10 shows a cross section of the stamping die relative to the axis 18. In one embodiment, the stamping die 36, as depicted in FIG. 8, has a plane or concave stamping surface 37. This stamping surface 37 exerts a uniform pressure over the front face 29 along the axis 18. The applied pressure lies in the range from 10,000 bar to 100,000 bar. The end piece 26 is compressed. Since the circumference of the end piece 26 is surrounded by the die tool 31, the material cannot escape the pressure and yield in the radial direction. The hollow space formed by the end section 30 (e.g. shown in FIG. 5) of the first longitudinal groove 27, which is not filled by the first molded part 34, allows the displaced material to be accommodated. The filling of the end section 30 closes the first longitudinal groove 27 that had previously been open on one side. The second longitudinal groove 28, in contrast, remains open, since its end section 30 is filled by the second molded part 35.

The stamping die 36 can have longitudinal grooves 37 whose angular position and cross section essentially match the cross section of the second longitudinal grooves 28. The projecting second molded parts 35 can engage into the longitudinal grooves 37 of the stamping die 36 when this stamping die 36 is pressed against the front face 29.

The processed blank 14 has an insertion end 13 that now forms at least one closed longitudinal groove 16 consisting of the first longitudinal groove 27, filled in at one end, and an open longitudinal groove 17 consisting of the second longitudinal groove 28. The processed blank 14 can be further processed. The shank 11 can be shaped, for example, by rolling, cutting or forging to form a spiral. A drilling head 12 is placed onto the shank 11 and attached by soldering or welding.

What is claimed is:

1. A production method for an insertion end comprising the following steps:
   forming a longitudinal groove in an outer surface of an end piece of a blank, the longitudinal groove being formed with an open end section on a front face of the end piece;
   surrounding the outer surface of the end piece by a die tool, the die tool engaging into the longitudinal groove away from the open end section; and
   closing the open end section of the longitudinal groove by compressing the surrounded end piece using a stamp acting on the front face.

2. The production method as recited in claim 1 wherein the die tool engages into the longitudinal groove with a molded part, the molded part being shorter than the longitudinal groove along an axis of the blank.

3. The production method as recited in claim 2 wherein the molded part fills the longitudinal groove with a positive fit, up to the open end section.

4. The production method as recited in claim 1 further comprising forming an additional longitudinal groove in the outer surface, the additional longitudinal groove having an additional open end section, the die tool engaging into the additional longitudinal groove to completely fill the additional longitudinal groove with an additional molded part.

5. The production method as recited in claim 4 wherein the longitudinal groove and the additional longitudinal groove are formed in one process step.

6. The production method as recited in claim 4 wherein the longitudinal groove and the additional longitudinal groove are formed in the outer surface by means of extrusion.

7. The production method as recited in claim 1 further comprising the steps of attaching the insertion end to a drilling, chiseling or boring tool.

8. The production method as recited in claim 7 further comprising forming a tool shape in a shank of the blank.

* * * * *